(12) United States Patent
Christiansen (10) Patent No.: US 10,582,291 B2
(45) Date of Patent: Mar. 3, 2020

(54) WIRELESS HEARING DEVICE

(71) Applicant: Oticon A/S, Smørum (DK)

(72) Inventor: Torben Christiansen, Ballerup (DK)

(73) Assignee: OTICON A/S, Smørum (DK)

( * ) Notice: Subject to any disclaimer, the term of this patent is extended or adjusted under 35 U.S.C. 154(b) by 41 days.

(21) Appl. No.: 15/814,903

(22) Filed: Nov. 16, 2017

(65) Prior Publication Data

US 2018/0139531 A1  May 17, 2018

(30) Foreign Application Priority Data

Nov. 17, 2016  (EP) .................................... 16199316

(51) Int. Cl.

| | |
|---|---|
| *H04R 25/00* | (2006.01) |
| *H04R 1/10* | (2006.01) |
| *H04R 3/00* | (2006.01) |
| *H04M 1/60* | (2006.01) |
| H04R 1/08 | (2006.01) |
| H04R 5/033 | (2006.01) |
| H04R 5/04 | (2006.01) |

(52) U.S. Cl.
CPC ........ *H04R 1/1066* (2013.01); *H04M 1/6066* (2013.01); *H04R 1/105* (2013.01); *H04R 1/1041* (2013.01); *H04R 3/005* (2013.01); H04R 1/08 (2013.01); H04R 1/1008 (2013.01); H04R 1/1016 (2013.01); H04R 5/033 (2013.01); H04R 5/04 (2013.01); H04R 2201/103 (2013.01); H04R 2201/107 (2013.01); H04R 2420/07 (2013.01); H04R 2460/13 (2013.01)

(58) Field of Classification Search
CPC .... H04R 1/1016; H04R 1/105; H04R 25/652; H04R 25/02; H04R 25/60; H04R 25/65
See application file for complete search history.

(56) References Cited

U.S. PATENT DOCUMENTS 6,738,485 B1 * 5/2004 Boesen ............... H04M 1/6066
181/130
6,810,987 B1 11/2004 DeKalb
(Continued)

FOREIGN PATENT DOCUMENTS

| WO | WO 95/30320 A1 | 11/1995 |
|---|---|---|
| WO | WO 2014/051416 A1 | 4/2014 |

*Primary Examiner* — Amir H Etesam
(74) *Attorney, Agent, or Firm* — Birch, Stewart, Kolasch & Birch, LLP (57) ABSTRACT

The invention relates to a wireless hearing device that comprises an ear part, an elongated part and a guide unit. The ear part is configured to be worn in an ear of the user of the hearing device and comprises a speaker unit that is arranged in an ear part housing of the ear part. The elongated part is attached to the ear part such that a distal end of the elongated part faces away from the ear part. Furthermore, the elongated part has an elongated part housing that is arranged to encompass a microphone unit with at least one microphone of the hearing device. The guide unit is arranged at the ear part such that the guide unit can be located between Tragus part and Antitragus part of the ear, while the ear part is in an operating position in the ear of the user, and wherein the guide unit allows a maintaining of a position of the ear part with respect to the ear such that the distal end of the elongated part points toward a user's mouth.

20 Claims, 4 Drawing Sheets (56) References Cited

U.S. PATENT DOCUMENTS

| | | | |
|---|---|---|---|
| 6,819,762 B2* | 11/2004 | Jones | H04M 1/05 379/430 |
| 8,666,102 B2* | 3/2014 | Bruckhoff | A61F 11/008 381/328 |
| 2002/0131585 A1 | 9/2002 | Jones et al. | |
| 2008/0311966 A1 | 12/2008 | Klein | |
| 2010/0098285 A1* | 4/2010 | Kusuda | H04M 1/05 381/375 |
| 2012/0063622 A1 | 3/2012 | Bruckhoff et al. | |
| 2015/0350762 A1 | 12/2015 | Birger et al. | |

* cited by examiner

WIRELESS HEARING DEVICE

TECHNICAL FIELD

The invention relates to a wireless hearing device and to a hearing system.

BACKGROUND

Wireless hearing devices with an ear part that is configured to be worn in an ear of a user of the hearing device and with an elongated part that faces away from the ear part are well known in the art. The ear part typically comprises a speaker unit that is arranged in an ear part housing of the ear part and that is connected to a processing unit of the hearing device, in order to enable an output of an acoustic sound signal to the user. The elongated part on the other hand provides an elongated part housing for a microphone unit with at least one microphone of the hearing device.

Such hearing devices, also called earplugs or headsets, thus allow the user to communicate via the wireless hearing device, while a second ear of the user can listen to environmental sound.

US 2008/311966 A1 describes a battery-powered miniature wireless headset that is worn as a single earring or as a pair of earrings. The wireless earring headset is comprised of an electronics module, a speaker unit, a microphone unit, an antenna, a battery, user interface devices such as a switch and LED, and an attachment means employing either a clamp or a pierced earring post with clutch. The user positions the speaker inside of, or at the entrance to the ear canal. A microphone of the microphone unit is mounted in such a way that it points towards the user's mouth and may be positioned on a boom to move it closer to the mouth.

SUMMARY

It is the object of the present invention to provide an improved wireless hearing device allowing a microphone unit to be arranged with respect to the user's mouth.

According to a first aspect, the invention relates to a wireless hearing device that comprises an ear part, an elongated part and a guide unit.

The ear part is configured to be worn in an ear of the user of the hearing device and comprises a speaker unit that is arranged in an ear part housing of the ear part and that is connected to a processing unit of the hearing device, and wherein the speaker unit is arranged to provide an acoustic sound signal to the ear of the user.

The elongated part is attached to the ear part such that a distal end of the elongated part faces away from the ear part. Furthermore, the elongated part has an elongated part housing that is arranged to encompass a microphone unit with at least one microphone of the hearing device.

The guide unit is arranged at the ear part such that the guide unit can be located between Tragus part and Antitragus part of the ear, while the ear part is in an operating position in the ear of the user, and wherein the guide unit allows a maintaining of a position of the ear part with respect to the ear such that the distal end of the elongated part, including a microphone, points toward a user's mouth.

The wireless hearing device according to the invention advantageously allows the elongated part to be pointed towards a user's mouth, without the risk of changing the position of the ear part in the ear due to a movement of the user's head. Locating the guide unit between Tragus part and Antitragus part is particularly advantageous since it allows the hearing device user a comfortable wearing.

Using the elongated part with the elongated part housing further allows a battery unit, which drives the hearing device, to be located in the elongated part and thereby reduces the size of the ear part.

The guide unit can be advantageously arranged such that it is nearly not visible for a surrounding of the user, by locating it between Tragus part and Antitragus part.

The place between Tragus part and Antitragus part of a human ear is also called incisura anterior auris, or intertragic incisure, or intertragal notch.

The wireless hearing device may be configured to communicate wirelessly to a mobile device, such as a smartphone, a cellphone, a tablet, or any kind of a computable device configured to communicate wirelessly to the wireless hearing device. The wireless communication in-between may be based on Bluetooth, Bluetooth Low energy, DECT, Near Field Communication or any kind of short range communication or long range communication.

A battery unit may be arranged within the elongated part housing and connected to the processing unit. Thereby, a size of the ear part of the hearing device is reduced, which allows an improved wearing comfort for the user.

The processing unit may be arranged within the ear part housing.

The guide unit of the hearing device may be provided as customized part of the hearing device. Preferably, the guide unit will be fitted to the respective ear of the user previous to a first use of the hearing device by the user. The guide unit and the ear part might be together fitted to the ear of the user for improving a wearing comfort of the hearing device.

The guide unit may extend along a first longitudinal axis and the elongated part may extend along a second longitudinal axis. In a first plane a first angle is formed between the first longitudinal axis and the second longitudinal axis. In a second plane a second angle is formed between the first longitudinal axis and the second longitudinal axis. The first plane has a first normal axis and the second plane has a second normal axis, where the first normal axis is orthogonal to the second normal axis. When the hearing device is worn in the ear of a user the first plane is rotatable around an ear-to-ear axis of the user. The ear-to-ear axis extends from left to right ear of a user's head.

If the first angle is zero the first longitudinal axis and the second longitudinal axis are in parallel in the first plane. The first angle may be between 10 degrees and 70 degrees depending on the shape of the intertragal notch of a user. The first angle may be between 10 degrees and 50 degrees, between 5 degrees and 35 degrees. The longitudinal axes do not intersect in the direction of extension of both the guide part and the elongated part.

If the second angle is zero the first longitudinal axis and the second longitudinal axis are in parallel in the second plane. The second angle may be between +/−5 degrees and +/−50 degrees depending on the shape of the intertragal notch of a user. The second angle may be between +/−5 degrees and +/−30 degrees, between +/−5 degrees and +/−20 degrees. The longitudinal axes do not intersect in the direction of extension of both the guide part and the elongated part when the second angle is positive and when negative they do intersect.

Where the guide part is mounted on the housing part of the hearing device has a distance to the elongated part which may vary according to the shape of the ear of the user.

The guide unit may at least partially be made of a flexible material. The flexible material can be a foam or a rubber, or any other material with a low elastic modulus. Thereby, the guide part can be angled in any direction, in order to improve a fitting of the hearing device at the user's ear. The flexible material can be further formed such that the guide unit is adaptable to different ear shapes. Thereby, the first angle and the second angle can be any angles between 0° and 90°.

The guide unit may comprise a flexible section and a non-flexible section, wherein the flexible section is attached to the ear part and the non-flexible section is configured to be arranged between Tragus part and Antitragus part of the ear. The flexible section may extend along the first longitudinal axis in different directions and the non-flexible section may extend along the first longitudinal axis. The flexible section may have a stiffness in the material such that it can still be used as a guiding unit. Thereby, the flexible section of the guide unit can be adaptable to different shapes of Tragus and Antitragus of an ear of a user. Both the non-flexible section and the flexible section may have an attachable interface which then makes it possible for the user to exchange the non-flexible section to a new non-flexible section which may be more suitable for the user. The flexible section may be fixedly or detachable mounted on the hearing device.

The guide unit (e.g. the flexible section or the whole guide unit) may be arranged at the ear part such that the guide unit is rotatable with respect to the ear part. This allows the elongated part of the hearing device to be easily arranged with respect to the user's mouth. Moreover, such a rotatable arrangement of the guide unit allows an improved adaptation of the hearing device to different face and/or ear geometries of hearing device users. Furthermore, the rotatable guide unit can enable the hearing aid user to use the hearing aid on both left and right ear, respectively. The guide unit may be rotatable around a rotation axis which is parallel to the ear-to-ear axis.

The guide unit may be flexible to the shape and size of the space between Tragus part and Antitragus part of the ear, however, if the guide unit is a hollow tube having different shapes, the inner diameter of the hollow tube does not change while adapting the guide unit to the space between Tragus part and Antitragus part of the ear. Thereby, the guide unit will still be suitable for amplifying acoustical voice signals.

The guide unit may extend along the first longitudinal axis and the elongated part extends along the second longitudinal axis of the hearing device, wherein the microphone unit comprises a plurality of microphones arranged in the elongated part housing at the second longitudinal axis. The plurality of microphones provides an improved capturing of sounds around the user, while the voice of the user is also captured by at least one microphone, which is preferably mounted at the distal end of the elongated part.

A first subset of microphones of the plurality of microphones may be directed to the user, in order to capture a voice sound of the user and to provide a respective microphone signal, and wherein a second subset of microphones of the plurality of microphones is directed away from the user, in order to capture environmental sound present around the user, and wherein the processing unit is further configured to provide a noise reduced electric sound signal by processing the microphone signal indicative of the voice sound with respect to the environmental sound. The microphone unit of this embodiment allows an improved sound processing taking into account the environmental noise that surrounds the hearing aid user. The first subset of microphones, which captures the voice sound, is preferably arranged at the distal end of the elongated part.

The guide unit may be slidable at the ear part housing in a sliding direction essentially perpendicular to the second longitudinal axis of the hearing device. The sliding direction is thereby essentially directed parallel or partly parallel to the ear-to-ear axis formed by both ears of the hearing aid user. Preferably, the hearing device of this embodiment can be advantageously adapted to different sizes of chin and ear of the user.

The guide unit may be hollow. Providing a hollow structure, the guide unit can be configured to act as an amplifier of acoustic signals, in particular of acoustic signals guided by bone conduction. Hearable sounds typically range from 20 to 20,000 Hz. The length of the guide unit and a shape of the guide unit might be advantageously adapted to the frequencies of audible sounds of the human ear. Preferably, the guide unit has a longitudinal length between 15 mm and 29 mm. This allows particularly advantageous amplification characteristic of the guide unit.

The guide unit is funnel-shaped having a diameter that varies from around 12 mm at a first guide unit section facing away from the hearing device to around 4 mm at a second guide unit section, which is attached to the ear part. Such a funnel-shape further allows particularly advantageous amplification characteristic of the guide unit. In a particularly preferred variant of this embodiment, the guide unit is shaped to have a similar amplification characteristic as a human ear canal.

Alternatively, the diameter may vary between a range of 4 mm to 16 mm, or 5 mm to 12 mm, or 10 mm to 16 mm or within a range of 4 mm to 10 mm.

Alternatively, the diameter may be constant within a range between 4 mm to 16 mm, or 5 mm to 12 mm, or 10 mm to 16 mm or within a range of 4 mm to 10 mm.

Alternatively, the largest diameter of the guide unit may be positioned at the second guide unit section and the lowest diameter at the first guide unit section.

The diameter may be of the hollow part of the guide unit. The guide unit may have a housing surrounding the hollow part of the guide unit. The housing may be made of two layers, a first layer which forms the hollow part (i.e. an inner core or a hollow tube) of the guide unit and a second layer which forms the outer layer of the housing. The first layer is configured to change its form without changing the diameter of the hollow part, i.e. the first layer and the second layer is configured to be adaptable to the shape of the ear of the user.

The first layer should be made of any kind of plastic material, such as PVC, which should be harder, i.e. a larger Shore index value, than the material of the second layer.

Additionally, the first layer may comprise structures such that the first layer may be flexible only in one direction such that the diameter of the hollow part does not change when flexing the guide unit.

The second layer may be made of a material which should be less hard than the material of the first layer. The material of the second layer may be a foam material, such as a memory foam, a syntactic foam, an integral skin foam, or a solid foam.

Additionally, the second layer may be flexible in any directions such that the guide unit is adaptable to the shape of the intertragic notch between the antitragus part and the tragus part.

The hearing device may further comprise a sensor unit, which is in mechanical contact with the guide unit and connected to the processing unit, in order to receive mechanical signals guided by bone conduction through the guide unit. Thereby, the guide unit might act as an amplifier for voice sound of the user, providing a bone conducted voice signal. The guide unit of this embodiment is preferably hollow. Furthermore, the bone conducted voice signal might be used in connection with the voice sound captured by the microphone unit. The processing unit might be further configured to provide a processed electric sound signal by processing the microphone signal indicative of the voice sound together with the bone conducted voice signal. The combination improves the capability of the processing unit to process the voice sound in such a way that the user will experience an improved voice sound quality. The improvement of the processing may for example be provided by improved adaptable filtering. The sensor unit of this embodiment can comprise any kind of sensor, such as a microphone. Preferably, the sensor unit of this embodiment comprises an accelerometer sensor. The sensor unit is typically positioned in the ear part housing.

The sensor unit of the wireless device may be configured to provide a vibration signal, when the user is moving the mouth. Preferably, the processing unit of this embodiment is further configured to process the received microphone signal indicative of the voice sound of the user with respect to the vibration signal. The vibrations are transmitted to the sensor unit via bones and/or tissue and/or cartilage within the ear and guided via the guide unit into the sensor unit. The guide unit may have multiple surfaces which are configured to touch or interfere with the ear of the user at multiple different places, and thereby, the guide unit is configured to capture the bone conducted voice signal from multiple places resulting in an improved signal level of the bone conducted voice signal compared to a solution where the capturing of the bone conducted voice signal is done at one place in the ear. The guide unit may touch or interfere with the ear at the antitragus and the tragus part and the bottom part of the intertragic notch. By using the vibration signal for processing the microphone signal, the processing unit can process microphone signals detected during a detection of vibrations indicative of mouth movement differently than microphone signals during on absence of mouth movement. Preferably, microphone signals are only processed by the processing unit, if vibrations indicative of mouth movement are detected at the same time. Thereby, the processing unit's ability to distinguish the voice of a user from environmental noise is improved, which leads to an improved elimination or minimization of noise in a received microphone signal. This further results in an improved signal-to-noise ratio of the acoustic sound signal provided by the speaker unit. Furthermore, the spot between Tragus part and Antitragus part is particularly suitable for performing a bone conduction measurement. Thereby, due to the placement of the guide unit, an improved own voice detection will be obtained via the bone conduction measurements of this embodiment.

The sensor unit that comprises an accelerometer sensor may be arranged and configured to measure the pulse of the user and to provide a respective pulse signal to the processing unit of the hearing device. The guide unit of this embodiment can advantageously act as an ideal guider of the pulse waves to the accelerometer sensor. The measure of the pulse waves are also based on vibrations like the measure of the bone conducted voice signal is.

The ear part may be fixated at the elongated part and the ear part housing and the elongated part housing form a common device housing of the hearing device. The hearing device might provide an improved robustness against external vibrations.

The hearing device might be a hearing aid, an ear protection device, a wireless hands-free system or a wireless speakerphone.

According to a second aspect, the invention relates to a hearing system, comprising a hearing device according to embodiments of the first aspect of the invention and a guide unit adapter that is arranged to fit into the intertragal notch of the user's ear and to receive the guide unit.

The guide unit adapter is preferably made of foam and is configured to fit the wireless hearing device perfectly between Tragus part and Antitragus part of the ear. The guide unit adapter according to the second aspect of the invention improves a wearing comfort while wearing the hearing device according to the first aspect of the invention. Preferably, the guide unit is customized with respect to a particular future hearing device user. The guide unit adapter might allow the hearing device to obtain an improved position of the microphone unit, in particular an improved position for receiving the voice of the hearing aid user. The improved position might lead to an improved signal-to-noise ratio of the acoustic sound signal provided to the user, since the capturing of the voice might be improved.

In a preferred embodiment of the hearing system, the guide unit adapter is arranged to receive the non-flexible part of the guide unit. The guide unit adapter of this embodiment provides an improved wearing comfort, while the non-flexible part of the guide unit ensures a reliable fitting of the hearing device at the guide unit adapter. Thereby, a reliable and comfortable fitting of the hearing system within the user's ear is provided.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts.

However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

A hearing device may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include i) arranging a unit of the hearing device behind the ear with a tube leading air-borne acoustic signals or with a receiver/loudspeaker arranged close to or in the ear canal such as in a Behind-the-Ear type hearing aid or a Receiver-in-the Ear type hearing aid, and/or ii) arranging the hearing device entirely or partly in the pinna and/or in the ear canal of the user such as in a In-the-Ear type hearing aid or In-the-Canal/Completely-in-Canal type hearing aid, or iii) arranging a unit of the hearing device attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

A hearing device may be part of a "hearing system", which refers to a system comprising one or two hearing devices, disclosed in present description, and a "binaural hearing system" refers to a system comprising two hearing devices where the devices are adapted to cooperatively provide audible signals to both of the user's ears. The hearing system or binaural hearing system may further include auxiliary device(s) that communicates with at least one hearing device, the auxiliary device affecting the operation of the hearing devices and/or benefiting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing device. The remote control is adapted to control functionality and operation of the at least one hearing devices. The function of the remote control may be implemented in a SmartPhone or other electronic device, the SmartPhone/electronic device possibly running an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

Figure 1:
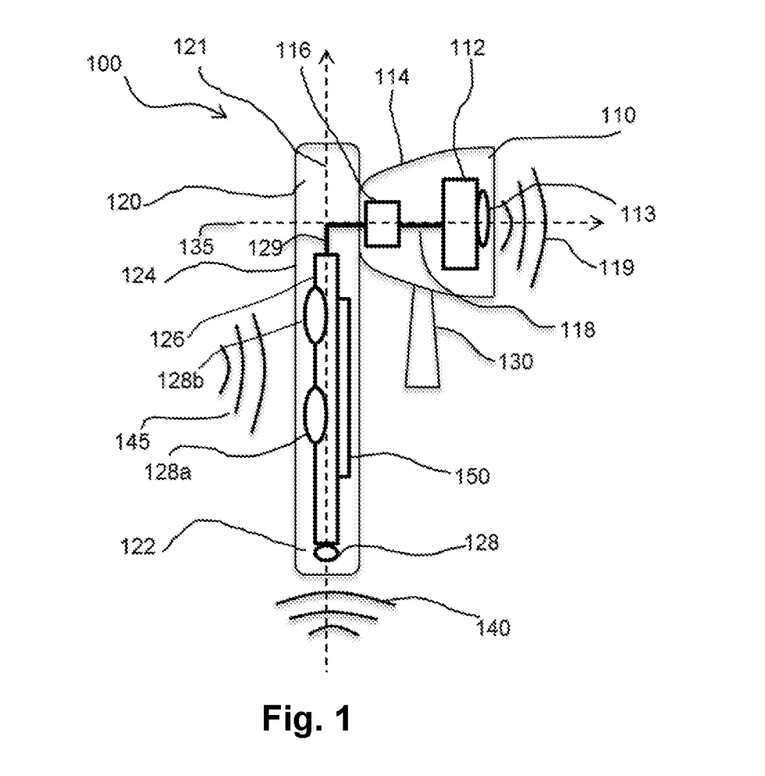
FIG. 1 illustrates a wireless hearing device according to a first embodiment of the invention.

Now referring to FIG. 1, which illustrates a first embodiment of the wireless hearing device 100 according to a first embodiment of the invention.

The wireless hearing device 100 comprises an ear part 110, an elongated part 120 and a guide unit 130.

The ear part 110 forms an ear plug and is configured to be worn in an ear of the user of the hearing device 100. It comprises a speaker unit 112 that is arranged in an ear part housing 114 of the ear part 110 and that is connected to a processing unit 116 of the hearing device 100. The processing unit 116 of this embodiment is positioned within the ear part housing 114. The speaker unit 112 comprises a speaker 113, which is surrounded by the ear part housing 114 and arranged to convert an electric sound signal 118 into an acoustic sound signal 119 and to provide the acoustic sound signal 119 to the ear of the user. The ear part housing 114 of this embodiment comprises a soft outside surface in order to provide a comfortable wearing.

The elongated part 120 is attached to the ear part 110 such that a distal end 122 of the elongated part 120 faces away from the ear part 110. Furthermore, the elongated part 120 has an elongated part housing 124 that is arranged to encompass a microphone unit 126 with at least one microphone 128 of the wireless hearing device 100. The microphone unit 126 of this first embodiment comprises three microphones 128, 128a, 128b, wherein one microphone 128 is arranged at the distal end 122 of the elongated part 120, in order to capture a voice sound 140 of the user and to provide a respective microphone signal 129. The further two microphones 128a, 128b are directed away from the user, in order to capture environmental sound 145 present around the user. The processing unit 116 is further configured to provide a noise reduced electric sound signal 118 to the speaker unit 112 by processing the microphone signal 129 indicative of the voice sound 140 with respect to the environmental sound 145. The microphones 128, 128a, 128b of the microphone unit 126 are arranged in the elongated part housing 124 along a second longitudinal axis 121 of the elongated part 120.

The elongated part 120 is attached to the ear part 110 via a common hearing device housing formed by the ear part housing 114 and the elongated part housing 124. In embodiments not shown, the elongated part is attached to the ear part via a rotatable coupling, allowing a rotation of the elongated part with respect to the ear part with an axis of rotation that is essentially perpendicular to the longitudinal axis of the elongated part.

The guide unit 130 is arranged at the ear part 110 such that the guide unit 130 can be located between Tragus part and Antitragus part of the ear, while the ear part 110 is in an operating position in the ear of the user, and wherein the guide unit 130 allows a maintaining of a position of the ear part 110 with respect to the ear such that the distal end 122 of the elongated part 120 points toward a user's mouth.

In this embodiment, the guide unit 130 is made of a flexible material. The flexible material has an elastic modulus that is low enough to ensure a comfortable wearing of the hearing device 100 by bending the guide unit 130 according to the present ear shape and high enough for maintaining the position of the ear part 110 in the ear during a movement of the user's head. The guide unit 130 is further adapted to fit between Tragus part and Antitragus part of the ear of a particular future hearing device user. Furthermore, the guide unit 130 is arranged at the ear part 110 such that the guide unit 130 is rotatable with respect to the ear part 110. The axis of rotation 135 is essentially formed by an axis that is perpendicular to the second longitudinal axis 121 of the elongated part 120. In an embodiment not shown, the guide unit can be slid within sliding grooves at the ear part housing in a sliding direction essentially perpendicular to the second longitudinal axis 121 of the wireless hearing device.

A battery unit 150, which is configured to power the wireless hearing device 100, is arranged within the elongated part housing 124 and connected to the microphone unit 126 and to the processing unit 116. In embodiments not shown, the battery unit is arranged within the ear part housing.

In an embodiment not shown, the processing unit is arranged within the elongated part housing of the hearing device.

The guide unit 130 is formed in order to fit between Tragus part and Antitragus part of the ear of the user. Different embodiments of the guide unit are described in the course of FIGS. 2 and 3.

Figure 2A:
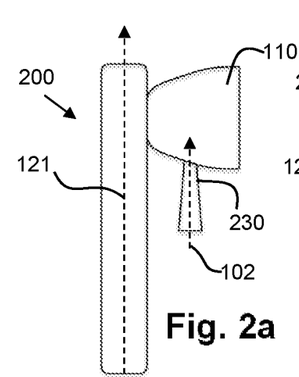
FIGS. 2*a*-2*f* illustrate different examples of the wireless hearing device having a guide unit.
Figure 2B:
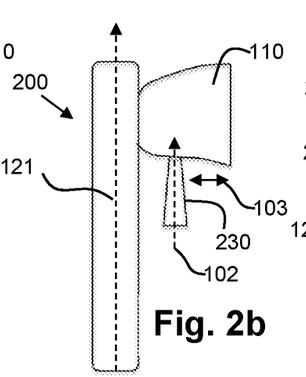
Figure 2C:
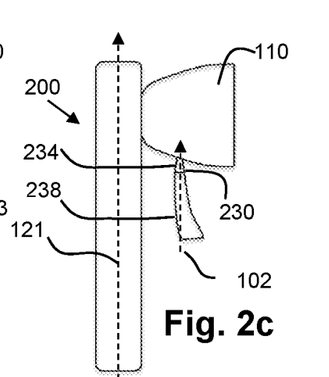

FIGS. 2a-2f show different examples of the wireless hearing device 200 having a guide unit 230 which may be flexible and/or non-flexible. In FIGS. 2a to 2b, the ear part 110 is shaped differently and the guide unit 230 is funnel shaped in both figures. In FIG. 2b the lower part of the ear part 110 compared to the upper part of the ear part 110 is shaped more flat and the upper part of the ear part 110 is more curved shaped. The reason why the lower part is more flat shaped is that the guide unit 230 should be able to slide in a sliding direction 103 being perpendicular to a first longitudinal axis 102 and the second longitudinal axis 121. In FIG. 2c, the guiding unit comprises a flexible section 234 and a non-flexible section 238 and the guide unit is funnel shaped. The non-flexible section 238 is attached to the ear part 110 via the flexible section 234 and the non-flexible section 238 is further configured to be arranged between Tragus part and Antitragus part of the ear. The guide unit 230 can thus be angled by any direction via the flexible section 238 in order to be adaptable to different ear shapes of the user.

Figure 2D:
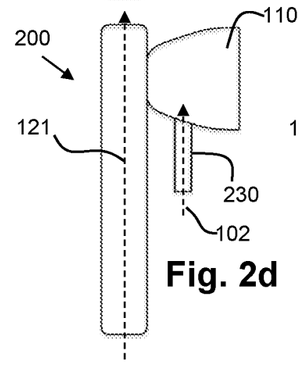
Figure 2E:
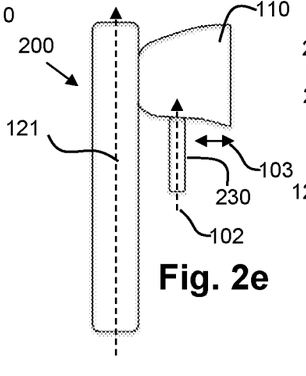
Figure 2F:
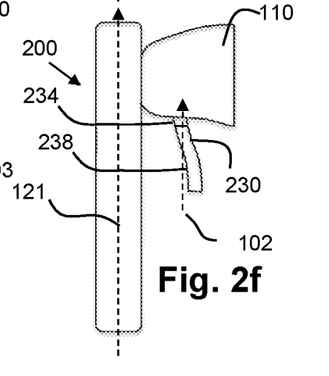

FIGS. 2d to 2f show similar examples of the wireless hearing device 200 as illustrated in FIGS. 2a to 2c, however, the guide unit is shaped differently. In this particular example, the guide unit is shaped as a straight tube.

The ear part 110 may have different shapes and the guide unit 230 may as well have different shapes which either improves the comfort of wearing the hearing device 200 and/or improves the acoustical experiences when wearing the hearing device 200.

Figures 3A, 3B:
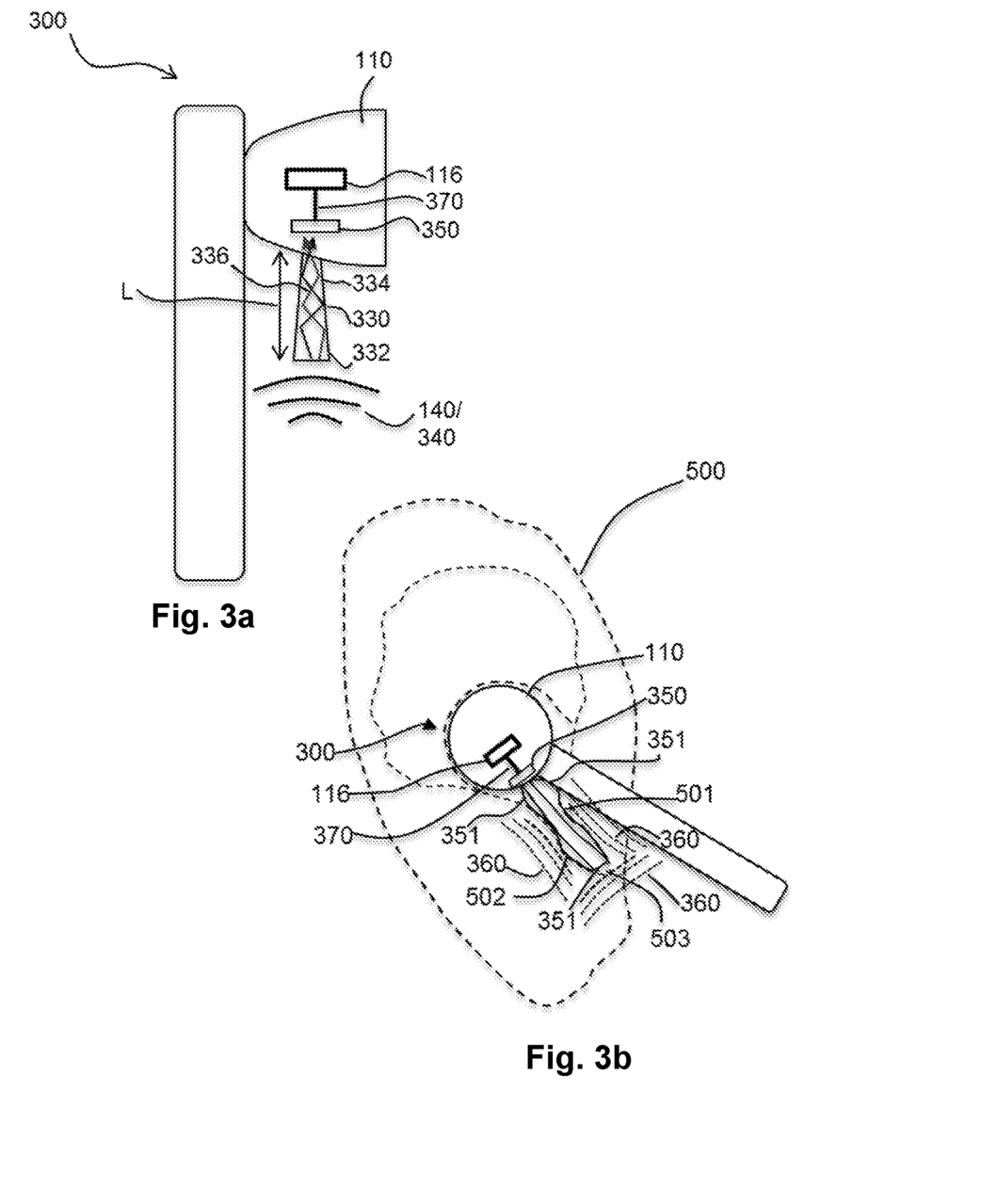
FIGS. 3*a*-3*b* illustrate the wireless hearing device with a sensor unit.

FIGS. 3a and 3b illustrate the wireless hearing device 300 with a sensor unit 350. The hearing device 300 is similar to the hearing device shown in FIG. 1, except for the additional sensor unit 350 arranged within the ear part housing 114.

In FIG. 3a the guide unit 330 is hollow and formed in order to amplify the voice sound 140 received by the guide unit 330. The amplification is provided via the internal acoustical reflections 336 generated by the hollow tube within the guide unit when the voice signal 140 is transmitted via air or via the tissue/bone of the user and received by the guide unit. The internal reflections are received by the sensor unit 350, which in this particular example may be a microphone.

In FIG. 3b the hearing device 300 is positioned within an ear 500 where the guide unit is positioned in the intertragic notch 503. The guide unit 330 has multiple surfaces 351 which is touching or interfering with the ear of the user at multiple different places. The surfaces 351 are touching the tragus part 501, the antitragus part 502 and the bottom part of the intertragic notch 503. In this particular example, the amplification is provided via the multiple surfaces of the guide unit, where the guide unit is configured to capture the bone conducted voice signal via the surface 351 resulting in an improved signal level of the bone conducted voice signal compared to a solution where the capturing of the bone conducted voice signal is done at one place in the ear. In this particular example the sensor unit 350 is an accelerometer.

In both examples shown in FIGS. 3a and 3b, the sensor unit 350 may comprise multiple sensors, such as a microphone and an accelerometer.

The length L of the guide unit 330 and the shape of the guide unit 330 may be adapted to the frequency of audible sounds in an ear of the user. The guide unit 330 has a longitudinal length L between 10 mm and 29 mm, in particular between 10 mm and 15 mm or about 15 mm. Furthermore, the guide unit 330 is funnel-shaped having a diameter that varies from around 12 mm at a first guide unit section 332 facing away from the hearing device 300 to around 4 mm at a second guide unit section 334, which is attached to the ear part 110. The diameter may varies from around 4 mm to around 15 mm, or from 10 mm to 16 mm. The funnel-shaped guide unit 330 is particularly advantageous for amplifying human sounds. A thickness of the hollow structure of the guide unit 330 ranges from 0.8 mm to 2.5 mm.

The diameter of the hollow part may be constant.

The sensor unit 350 is in mechanical contact with the guide unit 330 and connected to the processing unit 116, in order to receive mechanical signals 360 guided by bone conduction 340 through the guide unit 330 or to receive voice sound 140.

The sensor unit 350 is configured to provide a response signal 370, when the user is moving the mouth, and wherein the processing unit 116 is configured to process the received microphone signal 129 indicative of the voice sound 140 of the user with respect to the response signal 370. Thus, by processing the microphone signal 129 only if a mouth movement is present, the own voice detection of the hearing device 300 can be improved.

Typical structures of different types of sensor units, such as of sensor units comprising an accelerometer or a microphone, are well known in the art and therefore not discussed in the following.

In embodiments not shown, the accelerometer sensor is arranged and configured to measure the pulse of the user and to provide a respective pulse signal to the processing unit of the hearing device. In these embodiments, the hearing device comprises a user interface configured to allow a presentation of pulse information indicative of the pulse of the user.

Figure 4A:
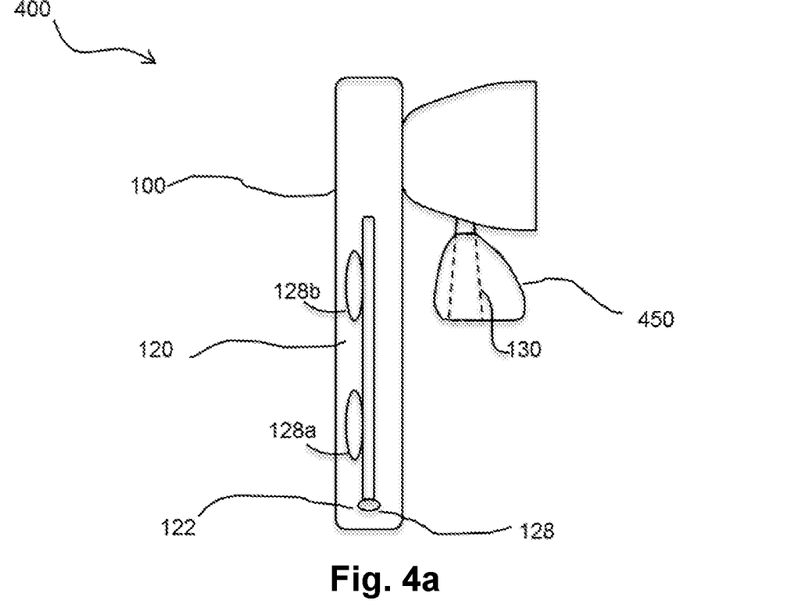
FIG. 4*a*-4*b* illustrate a hearing system including the wireless hearing device and a guide unit adapter.
Figure 4B:
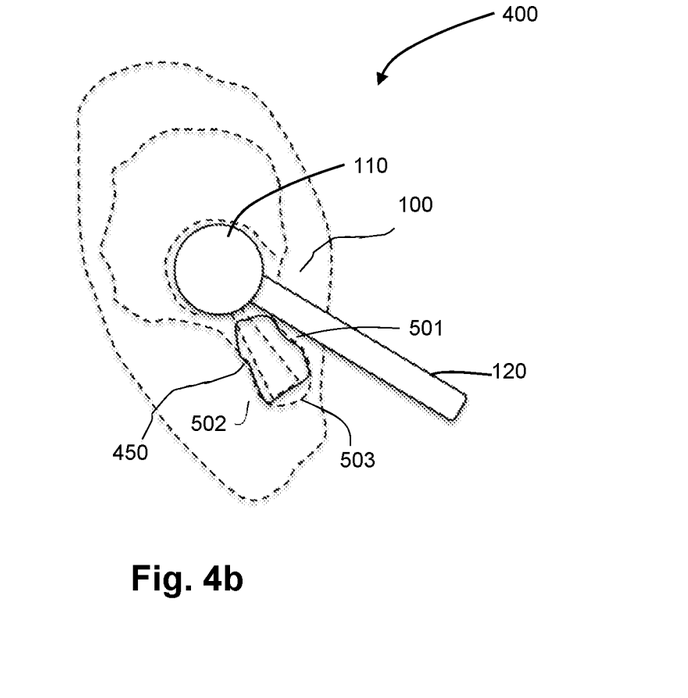

FIGS. 4a and 4b illustrate a hearing system 400 according to a second aspect of the invention.

In FIG. 4a, the hearing system 400 comprises the hearing device 100 according to the first embodiment illustrated in FIG. 1 and a guide unit adapter 450 that is arranged to fit into the intertragal notch 503 of the user's ear and to receive the guide unit 130.

The guide unit adapter 450 is made of foam or plastic material and custom-shaped in order to fit into the intertragal notch 503 of the user and to provide a comfortable wearing of the hearing device 100. By receiving the guide unit 130, the guide unit adapter 450 ensures a perfect fitting between Tragus part and Antitragus part of the ear and thereby obtains a position of the microphone 128 at the distal end 122 of the elongated part 120, such that microphone 128 is advantageously facing to the user's mouth.

The guide unit adapter 450 might further fit for a guide unit that is not customized, by allowing a standard-sized guide unit to be appropriately received and thereby positioned by the customized guide unit adapter 450.

In an embodiment not shown, the guide unit adapter is configured to receive a non-flexible guide unit section, while a flexible guide unit section provides a connection between non-flexible guide unit section and ear part, as shown in FIG. 2. Arranging the non-flexible guide unit section at the guide unit adapter improves a robustness of a connection formed by guide unit and guide adapter.

FIG. 4b shows the hearing system 400 positioned at the intertragal notch 503 of the ear of a user.

As used, the singular forms "a", "an", and "the" are intended to include the plural forms as well (i.e. to have the meaning "at least one"), unless expressly stated otherwise. It will be further understood that the terms "includes", "comprises", "including", and/or "comprising", when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more". Unless specifically stated otherwise, the term "some" refers to one or more.

| Reference number list | |
|---|---|
| 100, 200, 300 | Wireless hearing device |
| 102 | First longitudinal axis |
| 103 | Sliding direction |
| 110 | ear part |
| 112 | speaker unit |
| 113 | speaker |
| 114 | ear part housing |
| 116 | processing unit |
| 118 | electric sound signal |
| 119 | acoustic sound signal |
| 120 | elongated part |
| 121 | Second longitudinal axis |
| 122 | distal end |
| 124 | elongated part housing |
| 126 | microphone unit |
| 128, 128a, 128b | microphone |
| 129 | microphone signal |
| 130, 230, 330 | guide unit |
| 135 | axis of rotation |
| 140 | voice sound |
| 145 | environmental sound |
| 150 | battery unit |
| 234 | flexible section |
| 238 | non-flexible section |
| 332 | first guide unit section |
| 334 | second guide unit section |
| 336 | Internal acoustic reflection |
| 340 | bone conducted signals |
| 350 | sensor unit |
| 351 | multiple surfaces of the guide unit |

| Reference number list | |
|---|---|
| 360 | mechanical signal |
| 370 | response signal |
| 400 | hearing system |
| 450 | guide unit adapter |
| 500 | Human ear |
| 501 | Tragus |
| 502 | Antitragus |
| 503 | Intertragic notch |
| L | length of the guide unit |

The invention claimed is:

1. Wireless hearing device, comprising:
an ear part, which is configured to be worn in an ear of a user of the hearing device and which comprises a speaker unit that is arranged in an ear part housing of the ear part and that is connected to a processing unit of the hearing device, and wherein the speaker unit is arranged to provide an acoustic sound signal to the ear of the user;
an elongated part, which is attached to the ear part such that a distal end of the elongated part faces away from the ear part, and wherein the elongated part has an elongated part housing that is arranged to encompass a microphone unit with at least one microphone of the hearing device; and
a guide unit, which is arranged at the ear part such that the guide unit can be located between Tragus part and Antitragus part of the ear, while the ear part is in an operating position in the ear of the user, and wherein the guide unit allows a maintaining of a position of the ear part with respect to the ear such that the distal end of the elongated part points toward a user's mouth, wherein the guide unit is slidable at the ear part housing in a sliding direction essentially perpendicular to the second longitudinal axis of the hearing device.

2. Wireless hearing device according to claim 1, wherein the guide unit is arranged to extend from the ear part toward an intertragic notch of the ear so as to abut against at least two of the Tragus part, the Antitragus part, and a bottom part of the intertragic notch of the ear while the ear part is in the operating position in the ear of the user.

3. Wireless hearing device according claim 1, wherein the guide unit is at least partially made of a flexible material.

4. Wireless hearing device according to claim 1, wherein the guide unit comprises a flexible section and a non-flexible section, wherein the non-flexible section is attached to the ear part via the flexible section and wherein the non-flexible section is configured to be arranged between the Tragus part and the Antitragus part of the ear.

5. Wireless hearing device according to claim 1, wherein the guide unit is arranged at the ear part such that the guide unit is rotatable with respect to the ear part.

6. Wireless hearing device according to claim 1, wherein the guide unit has a first longitudinal axis and the elongated part defines a second longitudinal axis of the hearing device, and wherein the microphone unit comprises a plurality of microphones arranged in the elongated part housing at the second longitudinal axis.

7. Wireless hearing device according to claim 6, wherein a first subset of microphones of the plurality of microphones is directed to the user, in order to capture a voice sound of the user and to provide a respective microphone signal, and wherein a second subset of microphones of the plurality of microphones is directed away from the user, in order to capture environmental sound present around the user, and wherein the processing unit is further configured to provide a noise reduced electric sound signal to the speaker unit by processing the microphone signal indicative of the voice sound with respect to the environmental sound.

8. Wireless hearing device according to claim 1, wherein the guide unit is hollow.

9. Wireless hearing device according to claim 8, wherein the guide unit has a longitudinal length between 15 mm and 29 mm.

10. Wireless hearing device according to claim 8, wherein the guide unit is funnel-shaped having a diameter that varies from around 12 mm at a first guide unit section facing away from the hearing device to around 4 mm at a second guide unit section, which is attached to the ear part.

11. Wireless hearing device according to claim 1, wherein the hearing device further comprises a sensor unit, which is in mechanical contact with the guide unit and connected to the processing unit, in order to receive mechanical signals guided by bone conduction through the guide unit.

12. Wireless hearing device according to claim 11, wherein the sensor unit comprises an accelerometer sensor.

13. Wireless hearing device according to claim 11, wherein the sensor unit is configured to provide a vibration signal, when the user is moving the mouth, and wherein the processing unit is configured to process the received microphone signal indicative of the voice sound of the user with respect to the vibration signal.

14. Wireless hearing device according to claim 11, wherein the accelerometer sensor is arranged and configured to measures the pulse of the user and to provide a respective pulse signal to the processing unit of the hearing device.

15. Hearing system, comprising a hearing device according to claim 1 and a guide unit adapter that is arranged to fit into the intertragic notch of the user's ear and to receive the guide unit.

16. Wireless hearing device according to claim 3, wherein the guide unit comprises a flexible section and a non-flexible section, wherein the non-flexible section is attached to the ear part via the flexible section and wherein the non-flexible section is configured to be arranged between the Tragus part and the Antitragus part of the ear.

17. Wireless hearing device according to claim 3, wherein the guide unit is arranged at the ear part such that the guide unit is rotatable with respect to the ear part.

18. Wireless hearing device according to claim 4, wherein the guide unit is arranged at the ear part such that the guide unit is rotatable with respect to the ear part.

19. Wireless hearing device according to claim 3, wherein the guide unit has a first longitudinal axis and the elongated part defines a second longitudinal axis of the hearing device, and wherein the microphone unit comprises a plurality of microphones arranged in the elongated part housing at the second longitudinal axis.

20. Wireless hearing device according to claim 4, wherein the guide unit has a first longitudinal axis and the elongated part defines a second longitudinal axis of the hearing device, and wherein the microphone unit comprises a plurality of microphones arranged in the elongated part housing at the second longitudinal axis.

* * * * *